United States Patent
Wada

(10) Patent No.: US 9,392,169 B2
(45) Date of Patent: Jul. 12, 2016

(54) IMAGE PROCESSING APPARATUS, IMAGE PROCESSING METHOD, PROGRAM, AND IMAGING APPARATUS

(71) Applicant: CANON KABUSHIKI KAISHA, Tokyo (JP)

(72) Inventor: Katsuhiro Wada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/570,209

(22) Filed: Dec. 15, 2014

(65) Prior Publication Data

US 2015/0181130 A1    Jun. 25, 2015

(30) Foreign Application Priority Data

Dec. 19, 2013    (JP) ................................. 2013-262821

(51) Int. Cl.
*H04N 5/232*    (2006.01)
*H04N 5/77*    (2006.01)
*H04N 9/804*    (2006.01)
*H04N 9/82*    (2006.01)

(52) U.S. Cl.
CPC ........... *H04N 5/23245* (2013.01); *H04N 5/772* (2013.01); *H04N 9/8042* (2013.01); *H04N 9/8205* (2013.01); *H04N 5/23264* (2013.01)

(58) Field of Classification Search
USPC .................................................. 348/208.12
See application file for complete search history.

(56) References Cited

U.S. PATENT DOCUMENTS

| | | | | |
|---|---|---|---|---|
| 2010/0073492 | A1* | 3/2010 | Kudo | H04N 5/2171 348/208.1 |
| 2011/0279690 | A1* | 11/2011 | Kuroiwa | G06F 3/1204 348/207.2 |

FOREIGN PATENT DOCUMENTS

JP    2009-152672 A    7/2009

* cited by examiner

*Primary Examiner* — Roberto Velez
*Assistant Examiner* — Stephen Coleman
(74) *Attorney, Agent, or Firm* — Carter, DeLuca, Farrell & Schmidt, LLP

(57) ABSTRACT

An image processing apparatus includes an image data obtaining unit configured to obtain first image data which is generated by imaging an object using an imaging unit, an information obtaining unit configured to obtain photographing information of the first image data, and a file generating unit configured to generate a first image file based on the obtained first image data and the obtained photographing information. The file generating unit changes a size of an area of the first image data to be stored in the first image file according to the photographing information.

16 Claims, 7 Drawing Sheets

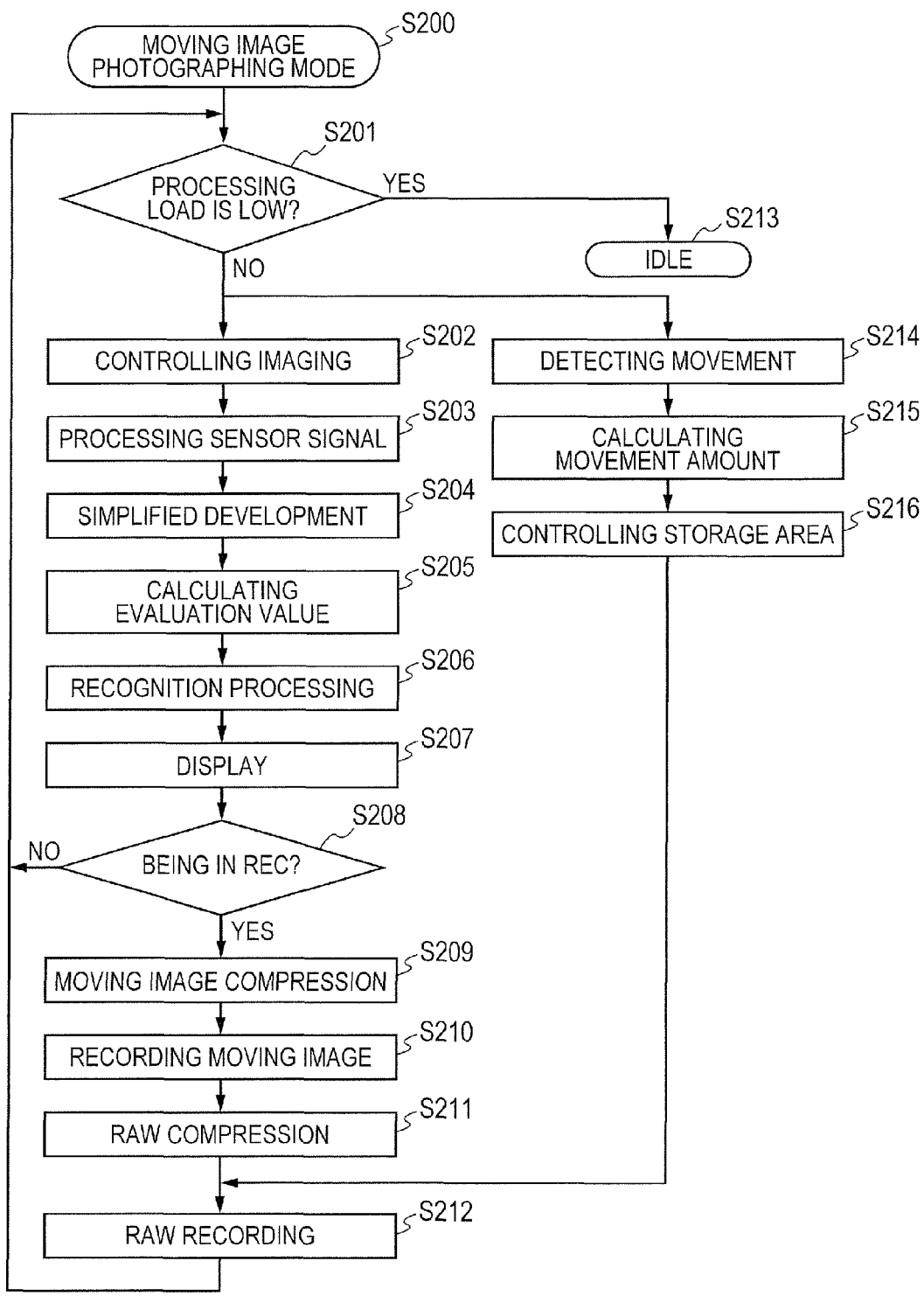

IMAGE PROCESSING APPARATUS, IMAGE PROCESSING METHOD, PROGRAM, AND IMAGING APPARATUS

BACKGROUND OF THE INVENTION

1. Field of the Invention

The present invention relates to an image processing apparatus, an image processing method, a program, and an imaging apparatus, and particularly to an image processing apparatus, an image processing method, a program, and an imaging apparatus which can record a moving image or a still image and a raw image thereof.

2. Description of the Related Art

In a conventional imaging apparatus, a raw image signal (a raw image) imaged by an imaging sensor is subjected to a debayer processing (a de-mosaicing processing) to be converted into a signal containing a luminance and a color difference, and a so-called development processing such as a noise removal, an optical distortion correction, and a normalization of image is performed on each signal. In general, the developed luminance signal and the developed color difference signal are subjected to a compression coding and recorded in a recording medium.

As described above, in the imaging apparatus which processes the raw image, an amount of data necessary for the recording is expanded and thus a large capacity of recording medium is required. However, since the raw image has advantages such as correcting an original image, suppressing a deteriorating of image quality to a minimum, and editing the image after the photographing, the raw image is likely used by a skilled person. For example, as the advantage of editing the image after the photographing, an electronic vibration correction can be performed as a vibration correction at a higher level.

Japanese Patent Application Laid-Open No. 2009-152672 proposes a technology in which when the raw image is recorded, movement amount data such as an output value of an angular velocity sensor and a movement amount of an imaging element calculated from the output value is obtained for each frame and recorded in the recording medium, and then used when the raw image is developed at the time of reproducing.

The imaging apparatus in recent years has been significantly increased in the number of pixels per image in accordance with the progress of the imaging sensor. In addition, the number of pieces of image which can be photographed per second also tends to be increased. Therefore, a throughput of each process included in the development processing such as the debayer processing, the noise removal, and the optical distortion correction performed on the raw image is increased in a synergistic manner, and a large scaled circuit and much power consumption are caused due to the development processing performed in a real time in parallel with the photographing. In some cases, a high photographing performance is not able to be achieved due to the limitation on an occupancy area of the development processing circuit and the power consumption.

In addition, the recording medium such as a large capacity of CF and an SD card is required depending on the imaging apparatus which processes the raw image. For example, in a case where a horizontal resolution is about 4,000 (4K) pixels, the amount of processing data becomes about 11.6 million pixels in total number of pixels, and about 8.3 million pixels in the number of effective pixels.

As disclosed in Japanese Patent Application Laid-Open No. 2009-152672, in a case where the raw image is developed after the photographing to perform a vibration correcting process with a high accuracy, the amount of movement data (data necessary for a correcting operation) in addition to the raw image is necessarily stored at the time of recording, and a larger capacity of recording medium is required.

Furthermore, since the vibration correcting process is performed after the photographing, there is a need to record data of an area wider than an originally-required angle of view (the angle of view to be photographed), which causes an increase in the capacity of the recording medium.

Therefore, an object of the invention is to provide a technology of controlling an area of image data to be recorded in the recording medium when the image data of the area wider than the originally-required angle of view is recorded in the recording medium for the vibration correcting process after the photographing.

SUMMARY OF THE INVENTION

According to the invention in order to achieve the above object, an image processing apparatus includes an image data obtaining unit configured to obtain first image data which is generated by imaging an object using an imaging unit, an information obtaining unit configured to obtain photographing information of the first image data, and a file generating unit configured to generate a first image file based on the obtained first image data and the obtained photographing information. The file generating unit changes a size of an area of the first image data to be stored in the first image file according to the photographing information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart illustrating an operation in a moving image photographing mode of the imaging apparatus according to the first embodiment of the invention.

DESCRIPTION OF THE EMBODIMENTS

Hereinafter, embodiments of the invention will be described in detail with reference to the drawings.

First Embodiment

Figure 1:
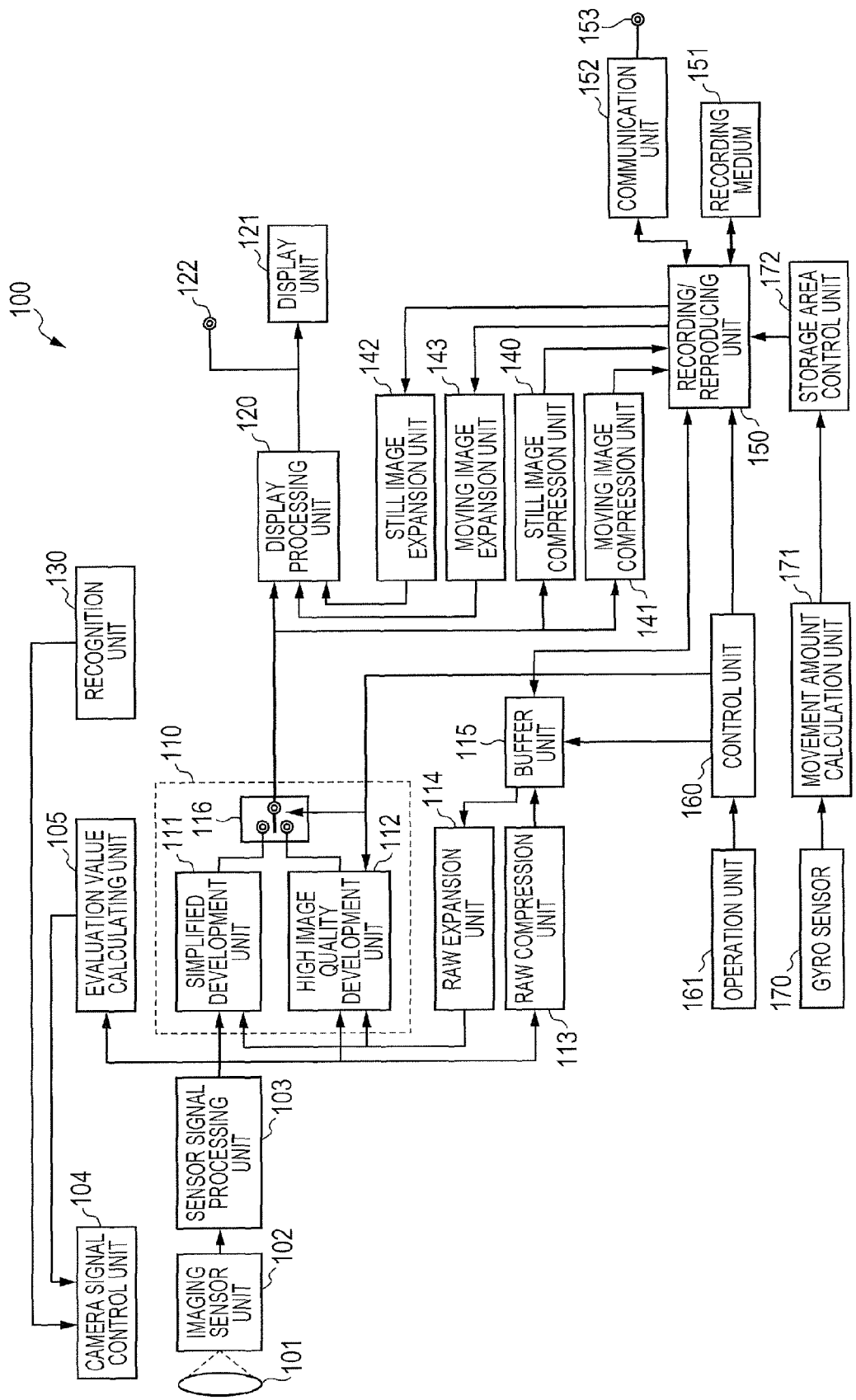
FIG. 1 is a block diagram illustrating an exemplary configuration of an imaging apparatus according to a first embodiment of the invention.

FIG. 1 is a block diagram illustrating an exemplary configuration of an imaging apparatus according to a first embodiment of the invention. An imaging apparatus 100 illustrated in FIG. 1 has not only a function of recording image data obtained by imaging an object in a recording medium but also functions of reproducing, developing, and displaying the image data from the recording medium. In addition, the imaging apparatus 100 also has a function of transmitting and receiving the image data with respect to an external apparatus or a server (cloud) in order to perform the recoding, the reproducing, or the displaying. Therefore, the imaging apparatus according to the embodiment of the invention may be expressed as an image processing apparatus, an image recording apparatus, an image reproducing apparatus, an image recording/reproducing apparatus, a communication apparatus, or the like.

In FIG. 1, a control unit 160 includes a CPU and a memory which stores a control program executed by the CPU, and controls the entire operation of the imaging apparatus 100. An operation unit 161 includes an input device such as a key, a button, and a touch panel which are used to make an instruction with respect to the imaging apparatus 100 by a user. The control unit 160 detects an operation signal from the operation unit 161, and controls the respective units of the imaging apparatus 100 to perform an operation according to the operation signal. A display unit 121 is configured by a liquid crystal display (LCD) to display a photographed or reproduced image, a menu screen, and various types of information in the imaging apparatus 100.

When a start of a photographing operation is instructed by the operation unit 161, an optical image of an object (an imaging target) is input through a photographing optical system 101, and is formed on an imaging sensor unit 102. The operations of the photographing optical system 101 and the imaging sensor unit 102 at the time of photographing are controlled by a camera signal control unit 104 based on a calculating result on an evaluation value such as an iris, a focus, a vibration, and the like obtained by an evaluation value calculation unit 105 and object information extracted by a recognition unit 130.

Figure 9:
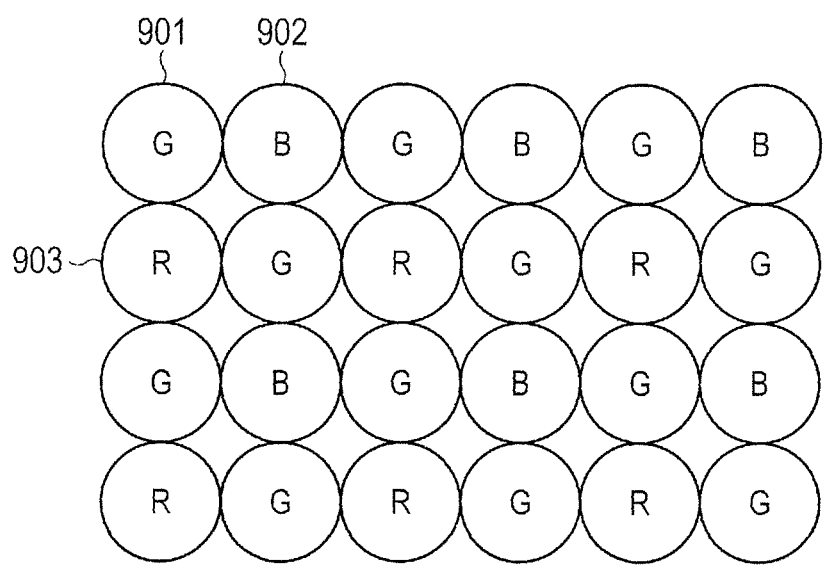
FIG. 9 is a diagram illustrating an exemplary arrangement of color sensors disposed in an imaging sensor unit.

The imaging sensor unit 102 photoelectrically converts an electrical signal of an object image transmitted through red, green, and blue (RGB) color filters disposed in each pixel to generate an image signal. FIG. 9 illustrates an example of color filters disposed in the imaging sensor unit 102, and the color filters correspond to a pixel arrangement of the image processed by the imaging apparatus 100. As illustrated in FIG. 9, red (R), green (G), and blue (B) are disposed in mosaic shape in each pixel, and focusing on 2×2 four pixels, one red pixel, one blue pixel, and two green pixels form a set and are configured to be regularly arranged. Such an arrangement of pixels is generally called a Bayer array.

The image signal generated by the imaging sensor unit 102 through the photoelectric conversion performs a recovery processing of pixel by a sensor signal processing unit 103, and is output as the image data. The recovery processing includes a process of interpolating values of a lacking pixel and a low reliability pixel of the imaging sensor unit 102 using the peripheral pixel values, or subtracting a predetermined offset value. In the embodiment, the image data output from the sensor signal processing unit 103 will be referred to as a raw image which means an undeveloped image. In the embodiment, as described above, the imaging sensor unit 102 and the sensor signal processing unit 103 constitute a raw image data obtaining unit.

The raw image is developed by a development unit 110. The development unit 110 has a plurality of different development processing units, and includes a high image quality development unit 112 as a first development unit and a simplified development unit 111 as a second development unit. In addition, the development unit 110 includes a switch unit 116 which selects the output from the first and second development units. The simplified development unit 111 and the high image quality development unit 112 both perform a debayer processing (a de-mosaicing processing) on the raw image to be converted into a signal containing a luminance and a color difference, and performs a so-called development processing such as a removal of noises contained in each signal, an optical distortion correction, and a normalization of image.

In particular, the high image quality development unit 112 performs the respective processes with an accuracy higher than the simplified development unit 111, and thus obtains a development image having an image quality higher than the simplified development unit 111, and on the other hand a processing load is increased. Then, the high image quality development unit 112 of the embodiment is not specialized in a real-time development in parallel with the photographing, but is controlled to perform a distributed processing at a time interval after the photographing. Since such a high image quality development is performed not at the time of photographing but at a time interval thereafter, it is possible to suppress an increase (peak) in circuit scale and power consumption at a low level. On the other hand, the simplified development unit 111 performs a development having an image quality lower than the high image quality development unit 112, but is configured to process a small amount of processing for the development compared to the high image quality development so as to enable the development processing at a high speed during the photographing. Since the processing load of the simplified development unit 111 is small, the simplified development unit 111 is controlled to be used when the real-time development is performed in parallel with the photographing operation. The switch unit 116 is controlled by the control unit 160 to select a simplified development processing or a high image quality development processing according to a control corresponding to an operation content or an executing operation mode instructed by the user through the operation unit 161.

Further, the embodiment has been described about an exemplary configuration in which the development unit 110 independently includes the simplified development unit 111 and the high image quality development unit 112, but one development unit may be configured to switch its operation modes to exclusively perform the simplified development and high image quality development processings, which falls within the range of the invention.

The image data developed by the development unit 110 is displayed by the display unit 121 after a predetermined display processing is performed by a display processing unit 120. In addition, the image data thus developed may be output by an image output terminal 122 to a display machine connected to the outside. The image output terminal 122, for example, is a general-purpose interface such as an HDM interface and an SD interface.

The image data developed by the development unit 110 is also supplied to the evaluation value calculation unit 105 to calculate an evaluation value such as a focus state and an exposure state from the image data.

In addition, the image data developed by the development unit 110 is also supplied to the recognition unit 130. The recognition unit 130 has a function of detecting and recognizing the object information in the image data. For example, the recognition unit 130 detects a face in a screen displayed by the image data and outputs information indicating a position of the face, and further recognizes a specific person based on the characteristic information such as the face.

The image data developed by the development unit 110 is also supplied to a still image compression unit 140 and a moving image compression unit 141. In a case where the image data is compressed as a still image, the still image compression unit 140 is used, and in a case where a moving image is compressed, the moving image compression unit 141 is used. The still image compression unit 140 and the moving image compression unit 141 each perform a high-efficiency encoding (the compression coding) on target image data, generate image data of which the information volume is compressed, and convert the image data into an image file (a still image file or a moving image file). The still image compression, for example, may be performed by using JPEG, and the moving image compression, for example, may be performed by using MPEG-2, H.264, H.265, or the like.

The raw compression unit 113 performs the high-efficient encoding on the raw image output by the sensor signal processing unit 103 using a technology such as a wavelet conversion or a difference encoding to convert the raw image into a raw image file in a compressed state, and stores the converted raw image file in a buffer unit (a storage medium) 115. The raw image file may be left in the buffer unit 115 and is readable, and may be moved and stored (erased from the buffer unit 115) in another recording medium after being stored in the buffer unit 115.

The raw file, the still image file, and the moving image file are stored in a recording medium 151 by a recording/reproducing unit 150. The recording medium 151 is a large-capacity built-in memory, a hard disk, a detachable memory card, or the like. The recording/reproducing unit 150 can read the still image file, the moving image file, and the raw file from the recording medium 151.

The recording/reproducing unit 150 has a function of writing (transmitting) or reading (receiving) various types of files with respect to the external storage or a server through a communication unit 152. The communication unit 152 is configured to make an access to the Internet or an external machine using a communication terminal 153 by a wireless communication or a wire communication.

The recording of the raw file to the recording medium 151 by the recording/reproducing unit 150 is controlled based on data output from a gyro sensor (the angular velocity sensor) 170. Specifically, the gyro sensor 170 detects the movement (a change in direction) of the imaging apparatus. The data output from the gyro sensor 170 is supplied to a movement amount calculation unit 171. The movement amount calculation unit 171 calculates a vibration amount of the imaging apparatus at the time of photographing. A storage area control unit 172 calculates an area necessary for the process of correcting the vibration based on the calculated vibration amount data. Then, the recording/reproducing unit 150 determines a recording area of the raw image based on the calculated area, and stores the determined recording area in the recording medium 151. Further, for example, the vibration amount may be detected by the evaluation value calculation unit 105 through a well-known image processing method.

Figure 6:
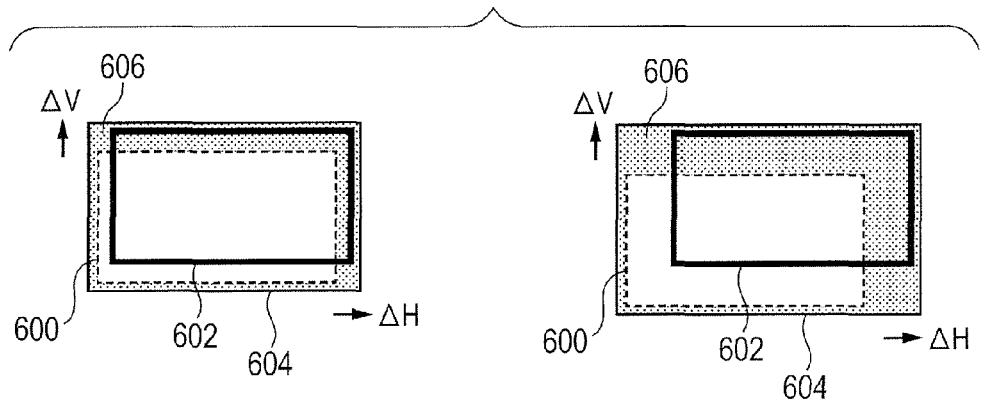
FIG. 6 is a diagram schematically illustrating a vibration of the imaging apparatus on image data.

Herein, FIG. 6 illustrates an example of the recording area of the raw image which is determined based on the output data of the gyro sensor 170. In the drawing, the broken line indicates an angle of view 600 when there is no vibration at the time of photographing, the thick line indicates an angle of view 602 when there is a vibration at the time of photographing, and the thin line indicates an area 604 which is necessary for the correction process after the photographing. In the drawing, a gray portion 606 indicates raw image data necessary for the correction process after the photographing, and corresponds to an area outside a photographing area 600 (an angle of photograph). The area outside the photographing area 600 (the angle of view) is stored in the recording medium 151 together with the area 600 (the broken line in the drawing) of the angle of photograph originally necessary. In other words, the raw image data of the area 604 including the areas 600 and 604 is stored, and the size of the area 606 at this time is determined from the vibration amount of the imaging apparatus. Therefore, the data amount of the recorded raw image data is appropriately controlled based on the vibration amount of the imaging apparatus, and it is prevented that the recording capacity of the recording medium is unnecessarily used. Further, the size of an image area of the imaging sensor unit is larger than the photographing area 600.

The size of the gray portion 606 which is an area necessary for the correction process after the photographing is controlled to be varied according to the sizes of the vibration amounts ΔH and ΔV with respect to the recording area based on the vibration amount (movement amount) ΔH in the horizontal direction and the vibration amount (movement amount) ΔV in the vertical direction. In other words, the size of the area of the raw image data (the raw image file) to be stored in the recording medium 151 is changed according to the size of the vibration amount of the imaging apparatus. In a case where the vibration amount of the imaging apparatus is large, a correction amount for the raw image after the photographing is large, so that the recording area for the recording in the recording medium 151 is widened (the gray portion 606 is made large). In addition, in a case where the vibration amount of the imaging apparatus is small, the correction amount for the raw image after the photographing becomes small, so that the recording area for the recording in the recording medium 151 is narrowed (the gray portion 606 is made small).

When the reproducing operation is started by the operation unit 161, the recording/reproducing unit 150 obtains a desired file from the recording medium 151 or through the communication unit 152 and reproduces the file. When the reproducing target file is the raw file, the recording/reproducing unit 150 stores the obtained raw file in the buffer unit 115. When the reproducing target file is the still image file, the recording/reproducing unit 150 supplies the obtained still image file to a still image expansion unit 142. When the reproducing target file is the moving image file, the recording/reproducing unit 150 supplies the obtained moving image file to a moving image expansion unit 143.

A raw expansion unit 114 reads out the raw file stored in the buffer unit 115, and decodes and expands the compressed raw file. The raw file expanded by the raw expansion unit 114 is supplied to the simplified development unit 111 and the high image quality development unit 112 in the development unit 110.

The still image expansion unit 142 decodes and expands the input still image file, and supplies the file to the display processing unit 120 as a reproduction image of the still image. The moving image expansion unit 143 decodes and expands the input moving image file, and supplies the file to the display processing unit 120 as a reproduction image of the moving image. The display processing unit 120 selects the supplied reproduction image according to a still image reproduction mode or a moving image reproduction mode, and supplies the selected reproduction image to the display unit 121.

Next, the description will be made about an operation in a moving image photographing mode of the imaging apparatus 100 according to the embodiment.

FIG. 2 illustrates a flowchart of the operation in the moving image photographing mode of the imaging apparatus according to the embodiment. The flowchart of FIG. 2 illustrates a processing operation which is performed when the control unit 160 controls the respective processing blocks. The respective steps (S) of the flowchart are realized by executing a program which is stored in a memory (ROM, not illustrated) included in the control unit 160 and developed onto a memory (RAM, not illustrated).

In FIG. 2, when the process in the moving image photographing mode is started by the operation unit 161 in S200, the control unit 160 determines whether a load status of processing of the imaging apparatus 100 is low in S201. The process transitions to S213 of an idle state when a frequency corresponds to a load status and, if not, proceeds to S202. For example, when a moving image of which the number of pixels is large (for example, a horizontal resolution of 4,000 pixels (4K), or a moving image having a high frame rate such as 120 frames (120 P) per second) is set, the processing load is high, and thus the process does not transition to S213 and proceeds to S202 always. In a case where the number of pixels is smaller than a predetermined value, or in a case where the frame rate corresponds to a setting value lower than a predetermined rate for the photographing of the moving image, the process transitions to S213, for example, at the half frequency between the processes of a first frame and a second frame of the moving image.

In S202, the camera signal control unit 104 controls the operations of the photographing optical system 101 and the imaging sensor unit 102 to perform the moving image photographing under a suitable condition. For example, a lens contained in the photographing optical system 101 is moved according to a zoom or focus instruction of the user, or a read-out area of the imaging sensor unit 102 is set according to an instruction of the number of photographing pixels. In addition, a control such as a focus adjustment and a tracking to a specific object is performed based on information of the evaluation value and the object information supplied from the evaluation value calculation unit 105 and the recognition unit 130.

In S203, the sensor signal processing unit 103 performs a signal processing on the image signal converted by the imaging sensor unit 102 for the recovery of pixel. Herein, the values of the lacking pixel and the low reliability pixel are interpolated using the peripheral pixel values or subtracted by the predetermined offset value. In the embodiment, the image data output from the sensor signal processing unit 103 after the process of S203 is called the raw image data which means data of an undeveloped moving image.

In S204, the simplified development unit 111 performs the development processing of the raw image data. At this time, the control unit 160 switches the switch unit 116 in the development unit 110 to select the image data developed by the simplified development unit 111.

The simplified development unit 111 performs the debayer processing (the de-mosaicing processing) on the raw image data forming each frame of the moving image to be converted into a signal containing a luminance and a color difference, and performs a so-called development processing such as a removal of noises contained in each signal, an optical distortion correction, and a normalization of image.

Herein, the development processing (simplified development) of the moving image performed by the simplified development unit 111 will be described. The simplified development unit 111 realizes a high speed and simplified development by limiting the image size after the development to, for example, an HD image of two millions or less pixels, or by limitedly performing or eliminating the noise removal and the optical distortion correction. In a case where the simplified development unit 111 performs a process after compressing the image size, or partially limits the function of the development processing, for example, the imaging apparatus 100 can realize a high speed photographing of an HD-sized image by a small-scaled circuit and at a reduced power consumption.

The image data developed by the simplified development unit 111 is supplied to the evaluation value calculation unit 105. In S205, the evaluation value calculation unit 105 calculates the evaluation value such as the focus state and the exposure state from a luminance value, a contrast value, and the like contained in the image data. Further, the evaluation value calculation unit 105 may obtain the raw image data before the development processing to calculate the evaluation value from the obtained raw image data.

In addition, the image data developed by the simplified development unit 111 is also supplied to the recognition unit 130. In S206, the recognition unit 130 detects the object (the face, etc.) from the image data, and recognizes the object information. For example, the presence or absence of the face in the image data and the position thereof are detected, and the recognition of a specific person is performed, and the result is output as information.

Furthermore, the image data developed by the simplified development unit 111 is also supplied to the display processing unit 120. In S207, the display processing unit 120 forms a display image from the obtained image data, and outputs the formed image to the display unit 121 or an external display apparatus for displaying. In the moving image photographing mode, the display image by the display unit 121 is used for a live view display (photographed through-image display) in order for the user to appropriately frame the object. Specifically, as a unique use form of the moving image, the display image is used in the live view display in order to appropriately frame the object even during the moving image is recording (on REC) as well as before the photographed moving image is recorded (on standby).

Further, the display image may be displayed to another display apparatus such as a television on the outside from the display processing unit 120 through the image output terminal 122. Furthermore, the display processing unit 120, for example, may have a function of displaying a mark in an in-focus area of the focus on the display image, or displaying a frame at a position of the recognized face by utilizing evaluation value information and the object information supplied from the evaluation value calculation unit 105 and the recognition unit 130.

In S208, the control unit 160 determines whether the photographed moving image is recording (on REC) by an instruction to start the recording from the user, and in a case where the moving image is on REC, the process proceeds to S210. In S208, in a case where the moving image is not on REC (that is, on standby), the process returns to S201, the photographing operation before the moving image is started to be recorded and the live view display are repeated. In S209, a portion from the recording start to the recording end in the moving image photographed in S208 is compressed on a frame basis by the moving image compression unit 141.

Voice information input through a microphone (not illustrated) is also simultaneously obtained together with the moving image. The moving image compression unit 141 performs the compression process even on the voice information corresponding to the moving image. The moving image compression unit 141 performs a high-efficient encoding (the moving image compression) on the image data and the voice information of the obtained moving image which is subjected to the simplified development, and generates the moving image file. Further, the moving image compression unit 141 performs the compression process using a commonly-known moving image compression technology such as MPEG-2, H.264, and H.265, and generates a file.

In S210, the recording/reproducing unit 150 records the moving image file in the recording medium 151.

Furthermore, the raw image data in a period corresponding to a recording-target moving image by S208 is supplied from the sensor signal processing unit 103 to the raw compression unit 113. In S211, the raw compression unit 113 converts the raw image data indicating the same scene as the recording-target moving image into the raw file as the high-efficient encoding (raw compression). The raw file is stored in the buffer unit 115. The high-efficient encoding performed by the raw compression unit 113 is made by a commonly-known technology such as the wavelet conversion and the difference encoding, and may be a lossy encoding or a lossness encoding. Alternatively, the raw image data may be through-output in an uncompressed state while eliminating the raw compression of the raw compression unit 113. Regardless of the presence or absence of the raw compression, in the embodiment, the raw image file recoverable as a high image quality file is generated without significantly degrading the image data supplied from the sensor signal processing unit 103.

In S214, the movement of the imaging apparatus 100 is detected by the gyro sensor 170. The movement data detected by the gyro sensor 170 is supplied to the movement amount calculation unit 171 in S215, and the movement amount calculation unit 171 calculates the vibration amount of the imaging apparatus at the time of photographing (information acquisition).

In S216, the storage area control unit 172 calculates the size of an area necessary for a vibration correcting process based on the obtained vibration amount data. Then, the recording/reproducing unit 150 determines the recording area of the raw image data based on the calculated size of the area, and records the raw image file in the recording medium 151.

In S212, after the recording/reproducing unit 150 records the raw image file in the recording medium 151, the process transitions to S201. Further, in S210 and S212, the recording/reproducing unit 150 may send the moving image file and/or the raw file from the communication terminal 153 to the external storage through the communication unit 152 so as to be stored in the external storage.

Hitherto, the flowchart of the operation in the moving image photographing mode in the imaging apparatus 100 according to the embodiment has been described. Further, since the number of frames processed at a time is small in a still image photographing mode, the high image quality development processing accompanying the vibration correction is performed at every still image photographing similarly to the conventional imaging apparatus, and the file is compressed and stored.

Herein, the structures of the moving image file and the raw image file according to the embodiment will be described.

Figure 3A:
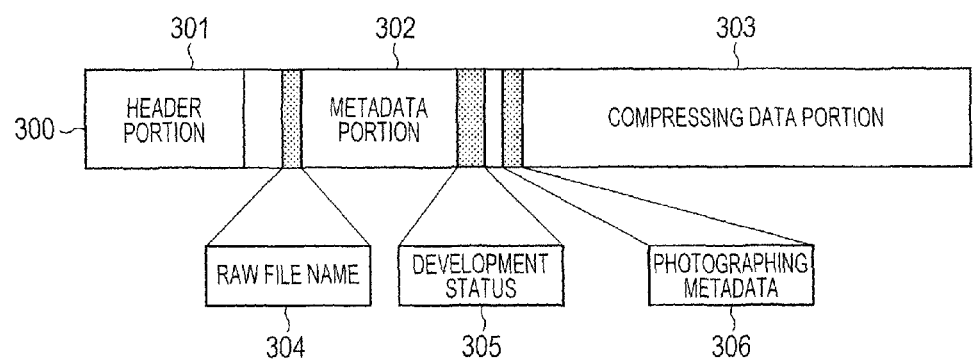
FIGS. 3A and 3B are diagrams illustrating exemplary configurations of a moving image file and a raw file in the first embodiment of the invention.
Figure 3B:
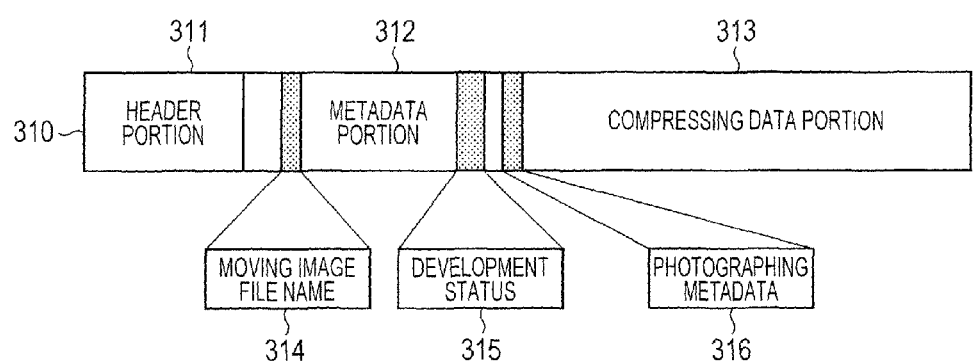

FIGS. 3A and 3B are diagrams illustrating exemplary configurations of the moving image file and the raw file according to the embodiment.

A moving image file 300 illustrated in FIG. 3A, for example, is stored in a predetermined recording area of the recording medium 151 by the recording/reproducing unit 150. The moving image file 300 includes a header portion 301, a metadata portion 302, and a compressing data portion 303, and an identification code indicating that the file is a moving image file format is included in the header portion 301. The compressing data portion 303 includes compression data of the moving image and the voice which are subjected to the high-efficient encoding.

The metadata portion 302 includes information 304 of a file name of the raw image file generated at the same time as the moving image file and information 305 of a development status indicating that the moving image file is subjected to the simplified development by the simplified development unit 111.

In addition, the moving image file 300 includes photographing metadata 306 which includes the evaluation value and the object information from the evaluation value calculation unit 105 and the recognition unit 130, and information (e.g., lens-type identifying information, sensor-type identifying information, etc.) at the time of photographing from the photographing optical system 101 and the imaging sensor unit 102. In addition, while not illustrated in the drawing, an identification code of the recording medium in which the raw image file generated at the same time is recorded and path information of a folder in which the raw image file is stored may be further included.

A raw file 310 illustrated in FIG. 3B, for example, is recorded in a predetermined recording area of the recording medium 151 by the recording/reproducing unit 150. The raw file 310 includes a header portion 311, a metadata portion 312, and a compressing data portion 313. The header portion 311 includes an identification code indicating that the file is a format of the raw image file, and the compressing data portion 313 includes raw compression data of the moving image subjected to the high-efficient encoding (or may include raw image data of the uncompressed moving image).

The metadata portion 312 includes information 314 of the file name of the moving image file generated at the same time as the raw file and information 315 of the development status indicating that the moving image file is subjected to the simplified development by the simplified development unit 111.

The raw file 310 includes photographing metadata 316 which includes the evaluation value and the object information from the evaluation value calculation unit 105 and the recognition unit 130, and information (e.g., lens-type identifying information, sensor-type identifying information, etc.) at the time of photographing from the photographing optical system 101 and the imaging sensor unit 102. Further, the photographing metadata 316 stores data calculated by the movement amount calculation unit 171 based on the movement data of the imaging apparatus detected by the gyro sensor 170. The data becomes a correction amount to be referred when the vibration correcting process is performed on the raw image data. For example, in a case where the high image quality development processing after the photographing is performed, based on the data stored as the metadata, the image data subjected to the vibration correcting process (movement process) is generated by cutting out a part of the compressed raw image data.

In addition, while not illustrated in the drawing, the photographing metadata 316 may further include the identification code of the recording medium in which the moving image file generated at the same time as the raw file is stored and the path information of a folder in which the raw image file is stored. Alternatively, the moving image file generated at the same time may be converted into the metadata and stored in the metadata portion 312.

The structures of various types of files according to the embodiment described above are exemplarily described, and may be configured in conformity with standard specifications such as DCF, AVCHD, and MXF.

Subsequently, S213 transitioning from S201 of FIG. 2 will be described using a flowchart of FIG. 4.

Figure 4:
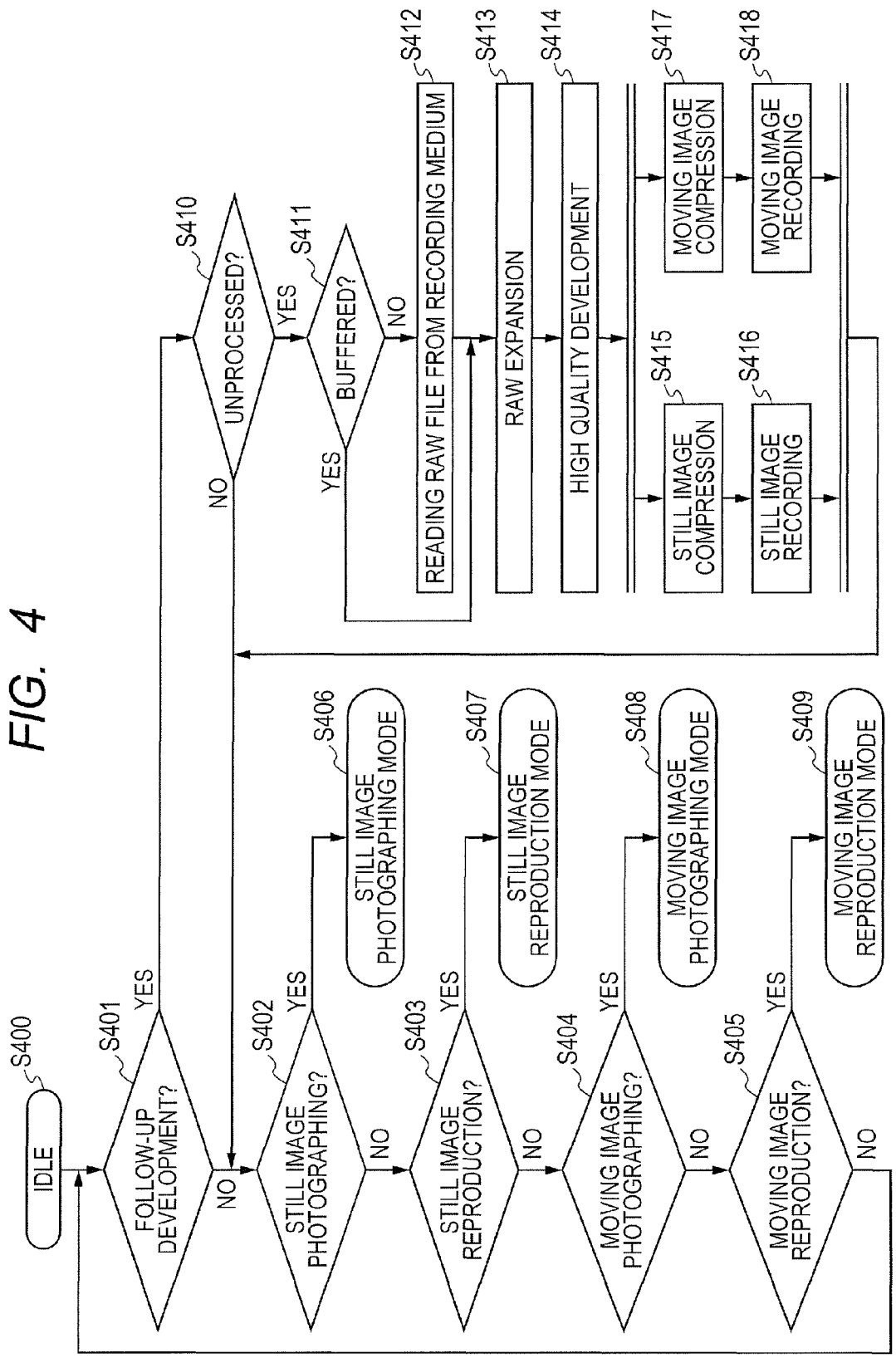
FIG. 4 is a flowchart of an operation in an idle state of the moving image photographing mode according to the first embodiment of the invention.

FIG. 4 illustrates the flowchart of an operation of an idle state in the photographing operation mode of the imaging apparatus 100 according to the embodiment. The flowchart of FIG. 4 shows a processing procedure of the operation which is executed when the control unit 160 controls the respective blocks. The respective steps (S) of the flowchart are realized by a program which is stored in a memory (ROM) included in the control unit 160 and developed on a memory (RAM) by a CPU of the control unit 160.

In FIG. 4, when the process of the idle state is started (S400), the control unit 160 determines whether a follow-up development is performed depending on a setting of the user (S401). In a case where the follow-up development is not performed, the process transitions to S402, and in a case where the follow-up development is performed, the process transitions to S410.

In a case where the follow-up development is not performed in S401, the control unit 160 determines a mode to transition from among the still image photographing mode, the still image reproduction mode, the moving image photographing mode, and the moving image reproduction mode according to a mode setting of the user (S402, S403, S404, and S405). Thereafter, the control unit 160 makes control of the transitioning of the flow to the operation process in the selected mode according to the determination (S406, S407, S408, and S409).

Herein, the "follow-up development" according to the embodiment will be described. The "follow-up development" is a process in which the high image quality development processing is newly performed using the raw image file as a source recorded in the buffer unit 115 or the recording medium 151 after the photographing operation in order to generate a high quality display image or a high quality still image file. The target raw file of the follow-up development according to the embodiment corresponds to both the still image and the moving image. According to the embodiment, the moving image file of the simplified development is spontaneously replaced with the moving image file of the high image quality development by slowly terminating the follow-up development of the moving image in an inter-photographing state and at the time of a state of which the processing load during a standby of user's operation is relatively small such as a reproduction mode, and a sleep state.

In S410, the recording/reproducing unit 150 determines whether there is left the raw file not subjected to the high image quality development processing in the buffer unit 115 or the recording medium 151. In a case where the recording/reproducing unit 150 determines that there is left no raw file which is not subjected to the high image quality development processing, the process proceeds to S402, and in a case where it is determined that there is left the raw file, the process proceeds to S411.

In S411, the recording/reproducing unit 150 determines whether the read-out target raw file is buffered in the buffer unit 115. In a case where it is determined that the raw file is not buffered, the recording/reproducing unit 150 reads the raw file out of the recording medium 151 or the like in S412, the process proceeds to S413, and in a case where it is determined that the raw file is buffered, the process skips S412 and proceeds to S413.

In S413, the raw expansion unit 114 decodes and expands the raw file read out of the buffer unit 115, and recovers the raw image data.

In S414, the high image quality development unit 112 performs the high image quality development processing on the recovered raw image data. At this time, in addition to the conversion to the signal containing the luminance and the color difference and the noise removal, the high image quality development unit 112 performs a cutting-off processing to correct a change in the angle of view at the time of photographing the moving image based on the movement amount data stored as the metadata of the imaging apparatus 100 so as to correct a change in the angle of view due to the vibration. At this time, not only the movement amount data but also the raw image data of the front and back frames are compared to calculate a detailed movement amount, and thus a cutting-out position may be set based on the calculated movement amount. In addition, in a case where the imaging sensor unit 102 is configured by a CMOS sensor, a rolling distortion due to the vibration is generated in the raw image data, so that a geometric deformation processing may be performed to correct the rolling distortion based on the movement amount data. In addition, since a tilt is generated in the raw image data due to an inclination of the imaging apparatus at the time of photographing the moving image, a tilt angle is calculated from the movement amount data, and a geometric deformation processing may be performed to correct the tilt.

In S415, the image data of each frame developed by the high image quality development unit 112 is supplied to the still image compression unit 140. The still image compression unit 140 performs the high-efficient encoding (the still image compression) on the image data, and generates the high quality still image file. Further, the still image compression unit 140 performs the compression process by a commonly-known technology such as JPEG. In S416, the recording/reproducing unit 150 records the high quality still image file in the recording medium 151.

In addition, in parallel with S415, the image data developed by the high image quality development unit 112 in S417 is supplied to the moving image compression unit 141, and the moving image compression unit 141 performs the moving image compression on the image data, and generates the high quality moving image file. In S418, the recording/reproducing unit 150 records the high quality moving image file in the recording medium 151.

After the processes of S416 and S418, the control unit 160 makes the process transition to S402.

Next, the operation in the moving image reproduction mode of the imaging apparatus 100 according to the embodiment will be described.

Figure 5:
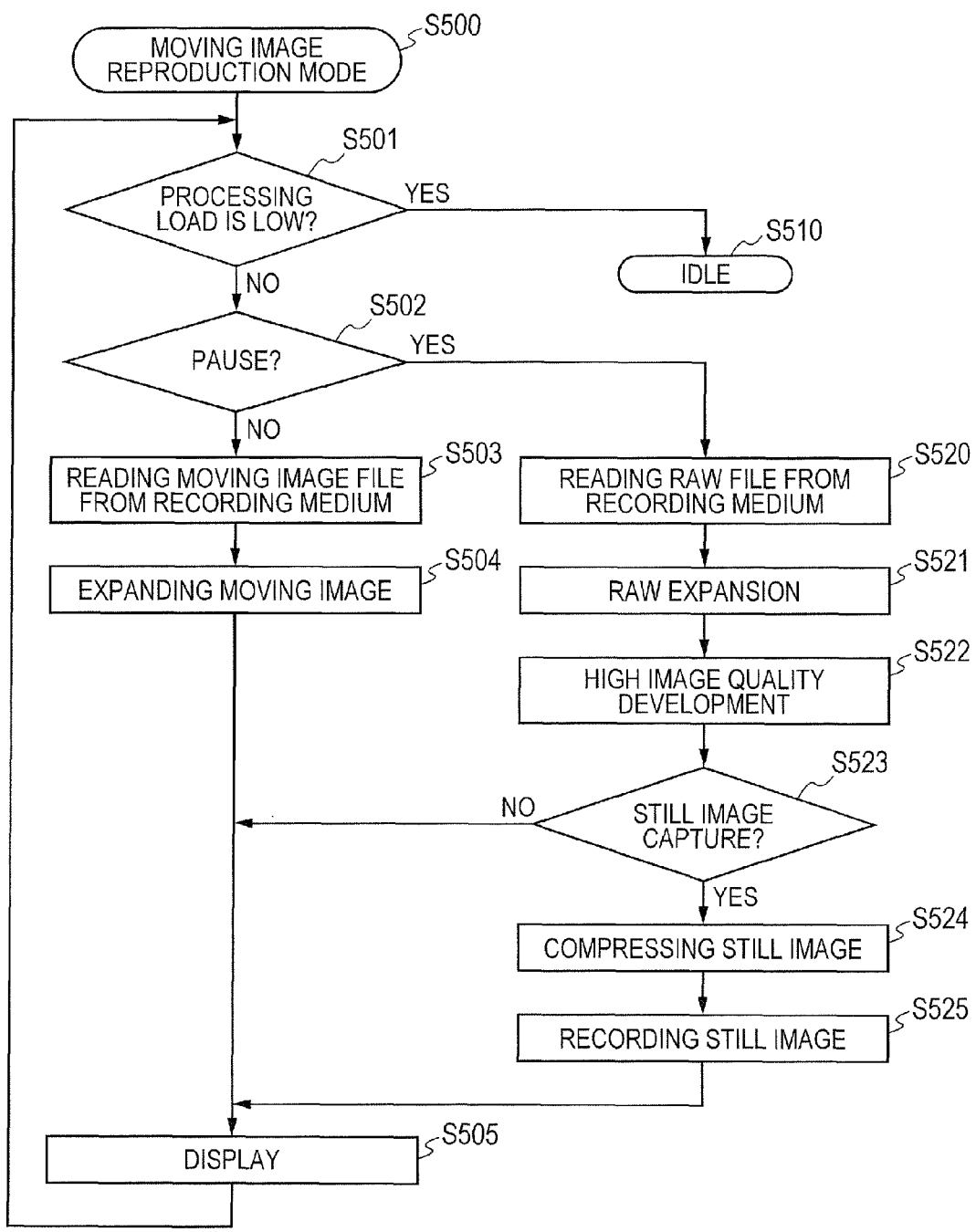
FIG. 5 is a flowchart of an operation in a moving image reproduction mode of the imaging apparatus according to the first embodiment of the invention.

FIG. 5 is a flowchart illustrating the operation in the moving image reproduction mode of the imaging apparatus 100 according to the embodiment. The flowchart of FIG. 5 shows a processing procedure which is executed when the control unit 160 controls the respective blocks. The respective steps (S) of the flowchart are realized by a program which is stored in a memory (ROM) included in the control unit 160 and developed on a memory (RAM) by a CPU of the control unit 160.

At the beginning, the operation of the moving image reproduction mode is assumed to be performed at the timing point when the follow-up development is not executed. In the embodiment, the moving image file of the simplified development is spontaneously replaced with the moving image file of the high image quality development by slowly terminating the follow-up development of the moving image in an inter-photographing state and at the time of a state of which the processing load during a standby of user's operation is relatively small such as a reproduction mode, and a sleep state. As the replacement is progressed, the high image quality development of the recorded moving image file is less likely to occur, and the high quality image can be always output without delay.

In FIG. 5, when the process of the moving image reproduction mode is started by the instruction of the operation unit 161 in S500, the control unit 160 determines whether the load status of processing of the imaging apparatus 100 is low in S501. When the load status is high, the process transitions to the idle state S510 at the corresponding frequency, and otherwise the process proceeds to S502. For example, since the processing load is low during a period when the operation such as a reproduction instruction of the user is waited for, the process transitions to S510. In a case where the reproduction of the moving image is started (including a reproducing state) according to the operation from the user, the process proceeds to S502.

In S502, the control unit 160 determines whether an instruction of a reproduction pause for the reproduced moving image is received from the user. When there is no pause instruction, the control unit 160 causes the process to proceed to S503 in order to maintain the moving image reproduction.

In S503, when the recording/reproducing unit 150 reads out the moving image file of a reproduction target from the recording medium 151, the moving image expansion unit 143 decodes and expands the moving image file for each frame in S504. Further, in a case where there is a moving image file subjected to the high image quality development by the follow-up development in the recording medium 151, the recording/reproducing unit 150 reads out the moving image file, and in a case where there is no such moving image file, the recording/reproducing unit 150 reads out the moving image file developed by the simplified development. Next, in S505, the display image of the moving image reproduced by the display processing unit 120 is output to the display unit 121, and the reproduced moving image is displayed.

In a case where the pause instruction is received in S502, the control unit 160 causes the process to transition to S520 such that the reproducing and displaying moving image is set to be in the pause state and the frame at a pause position when the moving image is paused is displayed as a still image. In the pause state, since the image is displayed in suspension, the image quality is easily recognized in detail compared to the case of the moving image. Furthermore, it is also considered that an instruction to enlarge the display during the pause state is likely to be received. Then, in the embodiment, the recording/reproducing unit 150 reads the raw file in S520 in order to provide an image display having an image quality higher than the moving image of the simplified development. Specifically, the recording/reproducing unit 150 reads the raw file corresponding to the reproducing moving image file and the frame of the raw image corresponding to the frame of the moving image in the pause state. At this time, when the read-out target raw file is buffered in the buffer unit 115, the raw image file is read out of the buffer unit 115, and when the read-out target raw file is not buffered, the raw file is read out of the recording medium 151.

In S521, the raw expansion unit 114 decodes and expands the raw file read out of the buffer unit 115 or the recording medium 151, and recovers the raw image data. In S522, the recovered raw image data is subjected to the high image quality development processing by the high image quality development unit 112. At this time, the high image quality development unit 112 corrects the vibration in the raw image data, the rolling distortion, and the tilt based on the movement amount data stored as the metadata of the imaging apparatus.

The imaging apparatus 100 may be configured to capture a high quality still image corresponding to the high quality frame in the pause state which is developed from the raw file of the moving image as a new still image file. Specifically, in S523, the control unit 160 determines whether a user instruction to capture the display image at a pause position as the still image is received. In a case where the instruction to capture the still image in S523 is not received, the control unit 160 controls a select switch 116 such that the high quality still image developed from the raw file of the moving image is supplied from the high image quality development unit 112 to the display processing unit 120.

In a case where the instruction to capture the sill image is received in S523, the image data developed by the high image quality development unit 112 is supplied to the still image compression unit 140 in S522. In S524, the still image compression unit 140 performs the high-efficient encoding (the still image compression) on the image data obtained by capturing, and generates the high quality still image file. Further, the still image compression unit 140 performs the compression process by a commonly-known technology such as JPEG.

In S525, the recording/reproducing unit 150 records the high quality still image file in the recording medium 151, and then the control unit 160 causes the process to transition to S505.

In S505, in a case where the instruction to capture the still image is received in S523, the high quality still image developed from the raw file of the moving image is supplied to the display processing unit 120, and the display processing unit 120 outputs the display image of the still image obtained by developing in a high image quality to the display unit 121. Through the process, the image displayed in the pause state of the moving image file is replaced by the display image of the still image obtained by developing the raw image in a high image quality.

Figure 7A:
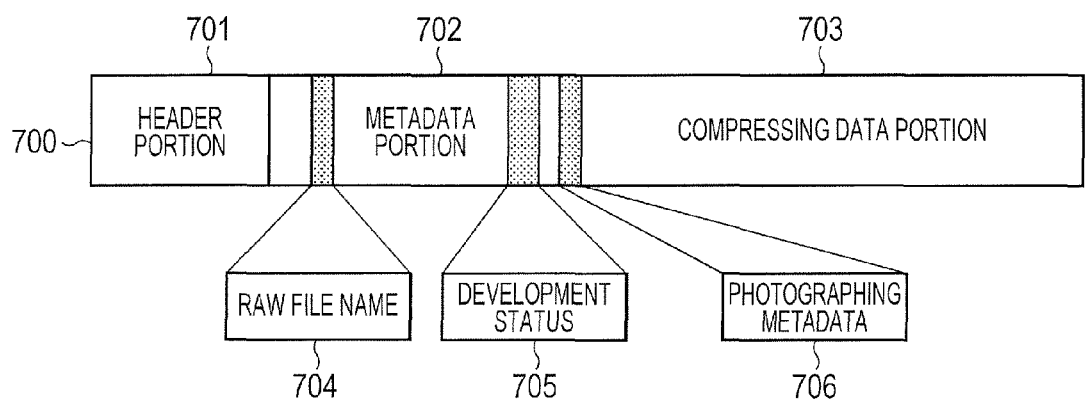
FIGS. 7A and 7B are diagrams illustrating exemplary configurations of a still image file and a raw file according to the first embodiment of the invention.

The high quality still image file generated by the still image compression unit 140 in S524 has the configuration of a still image file 700 of FIG. 7A. A metadata portion 702 stores the file name of the originally captured raw file of the moving image as information 704 of the file name of the raw file. In addition, photographing metadata 706 stores time information of the frame which is captured as the still image, and thus a frame position corresponding to the raw file of the moving image is indicated.

Figure 7B:
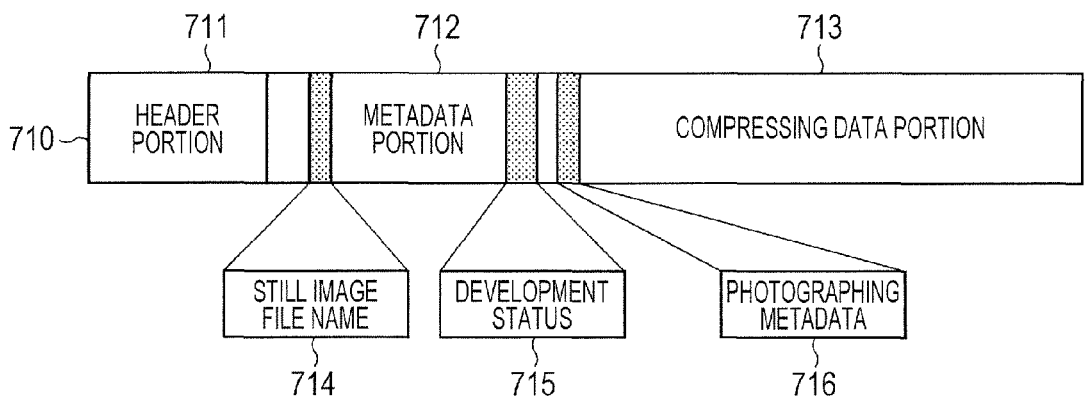

In addition, similarly to FIGS. 3A and 3B, even regarding the still image, the frame corresponding to the raw file of the moving image may be extracted as the still image to create a new raw file 710 (FIG. 7B) paring up with the raw file 700 at this time. Further, "Display" of S505 is performed for each frame, the process returns to S501 in order to display the next frame during a period when the moving image is reproducing. In S501, in a case where the process transitions to the idle state S510, the process is performed according to the flowchart of FIG. 5 described above.

In this way, the imaging apparatus 100 of the embodiment can easily reproduce the moving image without delay using the moving image file recorded at the time of photographing, and in the pause state, and can perform a display operation by replacing the high quality still image developed from the raw image file. Furthermore, it is also possible to easily capture the high quality still image as the still image file. Further, when the still image file is reproduced, similarly to the conventional imaging apparatus, the still image file subjected to the high image quality development processing may be read out of the recording medium 151 and expanded for displaying.

Hitherto, the description has been made about the embodiment, but the invention is not limited to the above embodiment. It is a matter of course that the invention is timely modified depending on a target circuit application within a range of technical ideas of the invention.

As described above, the capacity of the recording medium can be reduced by adaptively controlling an area of the raw image stored in the raw image file according to the vibration amount of the imaging apparatus at the time of photographing.

Modification of First Embodiment

Modifications of the first embodiment of the invention described above will be described. The modifications are examples in which photographing information other than the vibration amount of the imaging apparatus is used as data to be used for adaptively controlling the area of the raw image stored in the raw image file. Therefore, in the following modifications, the imaging apparatus and the operation thereof are similar to those of the first embodiment, and the descriptions thereof will not be repeated. Hereinafter, the photographing information used in the modifications will be described.

First Modification

As the photographing data stored in the metadata portion of the moving image file and the raw file, optical zoom information at the time of photographing is used. In a case where an optical zoom magnification is a wide-angle side, a vibration correction amount with respect to the raw image after the photographing becomes small, and thus the recording area used for the storing in the recording medium 151 becomes narrowed. On the other hand, in a case where the optical zoom magnification is a telephoto side, the vibration correction amount with respect to the raw image after the photographing becomes large, so that the recording area to be stored in the recording medium 151 becomes widened.

As described above, the capacity to be used for the recording in the recording medium 151 can be reduced by adaptively controlling the area of the raw image recorded in the recording medium 151 according to the information of a zoom magnification of the optical zoom at the time of photographing.

Second Modification

In addition, a moving amount of the object detected and recognized by the recognition unit 130 in the imaging apparatus 100 may be stored in the metadata portion. In this case, the area of the raw image to be stored in the recording medium 151 is controlled according to the detected moving amount.

In a case where the moving amount of the object is large, the vibration correction amount for the raw image after the photographing becomes large, so that the area to be stored in the recording medium 151 is widened. In addition, in a case where the moving amount of the object is small, the vibration correction amount for the raw image after the photographing becomes small, so that the area to be stored in the recording medium 151 is narrowed.

Figure 8A:
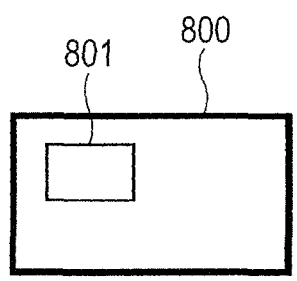
FIGS. 8A and 8B are diagrams illustrating an example of an object detection frame of the imaging apparatus.

Further, in a case where the object is detected by the recognition unit 130 in the imaging apparatus 100, the object existing in an object detection frame 801 in the angle of photograph 800 is detected as illustrated in FIG. 8A. In a case where a moving object is tracked, the object detection frame 801 is also moved in the angle of photograph to detect the object.

Figure 8B:
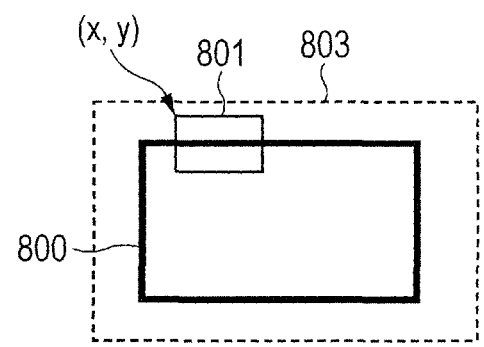

At this time, as illustrated in FIG. 8B, in a case where coordinates of the object detection frame 801 tracking the object, for example, the left upper coordinates ((x, y) in the drawing) of the detection frame 801 move to the outside of the angle of photograph, an area 803 including the coordinates of the object detection frame becomes an area to be necessary for the correction process after the photographing. The area 803 becomes an area wider than the photographing area 800. The area wider than the photographing area 800 is stored in the recording medium 151 together with the area 800 in the angle of photograph which is originally necessary. In addition, the coordinates of the object detection frame 801 is stored in the metadata portion.

As described above, the area of the raw image to be stored in the recording medium 151 is adaptively controlled according to the state of the object existing in the angle of photograph at the time of photographing, so that it is possible to reduce the capacity used for the recording in the recording medium 151.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-262821, filed on Dec. 19, 2013, which is hereby incorporated by reference herein in its entirety.

What is claimed is:

1. An image processing apparatus comprising:
a central processing unit (CPU) configured to perform functions of an image data obtaining unit, an information obtaining unit, a file generating unit, a first development unit, and a second development unit:

the image data obtaining unit configured to obtain first image data which is generated by imaging an object using an imaging unit;

the information obtaining unit configured to obtain photographing information of the first image data;

the file generating unit configured to generate a first image file based on the obtained first image data and the obtained photographing information;

the first development unit configured to generate second image data by performing first development processing on image data obtained from the first image file; and the second development unit configured to generate third image data by performing second development processing on the first image data, wherein the file generating unit changes a size of an area of the first image data to be stored in the first image file according to the photographing information, and wherein the first development processing is development processing having an image quality higher than the second development processing.

2. The image processing apparatus according to claim 1, wherein the photographing information includes at least one of a vibration amount of the imaging unit, a zoom magnification of the object, and a moving amount of the object, and the file generating unit determines the area based on the photographing information and an angle of photograph of the object.

3. The image processing apparatus according to claim 2, wherein the photographing information includes at least the vibration amount of the imaging unit, and the file generating unit sets the area to be large as the vibration amount is large.

4. The image processing apparatus according to claim 2, wherein the file generating unit stores the photographing information as metadata of the first image file.

5. The image processing apparatus according to claim 4, wherein the first development unit performs at least one of cutting-off processing and geometric conversion processing on the image data obtained from the first image file based on the photographing information.

6. The image processing apparatus according to claim 5, further comprising:

a display configured to display an image using read-out image data, wherein the display displays the image using the third image data, and wherein the first development unit performs the first development processing on a part of the first image data corresponding to the image displayed in the display.

7. The image processing apparatus according to claim 6, wherein the first image data and the third image data are image data of a moving image which includes a plurality of frames, the display displays the image using the image data of any one of frames which are included in the third image data, and the first development unit performs the first development processing on image data corresponding to any frame included in the first image data which corresponds to the image data of the frame displayed in the display.

8. An image processing method comprising:

obtaining first image data which is generated by imaging an object using an imaging unit;

obtaining photographing information of the first image data;

generating a first image file based on the obtained first image data and the obtained photographing information;

generating second image data by performing first development processing on image data obtained from the first image file; and generating third image data by performing second development processing on the first image data, wherein, in the generating the first image file, a size of an area of the first image data to be stored in the first image file is changed according to the photographing information, and wherein the first development processing is development processing having an image quality higher than the second development processing.

9. A non-transitory computer-readable storage medium having stored therein a program, wherein the program, when executed by a computer, causes the computer to perform an image processing method comprising:

obtaining first image data which is generated by imaging an object using an imaging unit;

obtaining photographing information of the first image data;

generating a first image file based on the obtained first image data and the obtained photographing information;

generating second image data by performing a first development processing on the image data obtained from the first image file; and generating third image data by performing a second development processing on the first image data, wherein, in the generating the first image file, a size of an area of the first image data to be stored in the first image file is changed according to the photographing information, and the first development processing is a development processing having an image quality higher than the second development processing.

10. An image processing method according to claim 8, wherein the photographing information includes at least one of a vibration amount of the imaging unit, a zoom magnification of the object, and a moving amount of the object, and in the generating the first image file, the area is determined based on the photographing information and an angle of photograph of the object.

11. An image processing method according to claim 10, wherein the photographing information includes at least the vibration amount of the imaging unit, and in the generating the first image file, the area is set to be large as the vibration amount is large.

12. An image processing method according to claim 10, wherein in the generating the first image file, the photographing information is stored as metadata of the first image file.

13. An image processing method according to claim 12, wherein in the generating the second image data, at least one of cutting-off processing and geometric conversion processing is performed on the image data obtained from the first image file based on the photographing information.

14. An image processing method according to claim 13, further comprising:
    displaying an image using read-out image data,
    wherein, in the displaying, the image is displayed using the third image data, and
    wherein, in the generating the second image data, the first development processing is performed on a part of the first image data corresponding to the image displayed in the display.

15. An image processing method according to claim 14, wherein
    the first image data and the third image data are image data of a moving image which includes a plurality of frames,
    in the displaying, the image is displayed using image data of any one of frames which are included in the third image data, and
    in the generating the second image data, the first development processing is performed on image data corresponding to any frame included in the first image data which corresponds to the image data of the frame displayed in the display.

16. An imaging apparatus comprising:
    an imaging unit;
    a photographing optical system configured to guide an object to the imaging unit; and
    an image processing apparatus comprising a central processing unit (CPU) configured to perform functions of an image data obtaining unit, an information obtaining unit, a file generating unit, a first development unit, and a second development unit:
    the image data obtaining unit configured to obtain first image data which is generated by imaging an object using an imaging unit;
    the information obtaining unit configured to obtain photographing information of the first image data;
    the file generating unit configured to generate a first image file based on the obtained first image data and the obtained photographing information;
    the first development unit configured to generate second image data by performing a first development processing on image data obtained from the first image file; and
    the second development unit configured to generate third image data by performing a second development processing on the first image data,
    wherein the file generating unit changes a size of an area of the first image data to be stored in the first image file according to the photographing information, and
    wherein the first development processing is a development processing having an image quality higher than the second development processing.

* * * * *